(12) United States Patent
Torii

(10) Patent No.: US 8,979,178 B2
(45) Date of Patent: Mar. 17, 2015

(54) PILLAR STRUCTURE

(75) Inventor: Nobuyuki Torii, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/355,074

(22) PCT Filed: Oct. 31, 2011

(86) PCT No.: PCT/JP2011/075085
§ 371 (c)(1),
(2), (4) Date: Apr. 29, 2014

(87) PCT Pub. No.: WO2013/065104
PCT Pub. Date: May 10, 2013

(65) Prior Publication Data
US 2014/0284967 A1 Sep. 25, 2014

(51) Int. Cl.
B60N 99/00 (2006.01)
B60R 22/24 (2006.01)
B62D 21/15 (2006.01)
B60R 22/22 (2006.01)
B62D 25/04 (2006.01)

(52) U.S. Cl.
CPC .............. *B60R 22/24* (2013.01); *B62D 21/157* (2013.01); *B60R 22/22* (2013.01); *B62D 25/04* (2013.01)
USPC .................................................... 296/193.06

(58) Field of Classification Search
USPC .......................... 296/187.12, 193.05, 193.06
See application file for complete search history.

(56) References Cited

U.S. PATENT DOCUMENTS 6,332,643 B1 * 12/2001 Sukegawa et al. ........ 296/203.03
6,923,492 B2 * 8/2005 Okazaki et al. ............ 296/146.6
7,878,546 B2 * 2/2011 Tabata et al. ................ 280/801.1

FOREIGN PATENT DOCUMENTS

| JP | 2003-081132 | 3/2003 |
| JP | 2003-226225 | 8/2003 |
| JP | 2009-184515 | 8/2009 |

* cited by examiner

*Primary Examiner* — Lori L Lyjak
(74) *Attorney, Agent, or Firm* — Oliff PLC

(57) ABSTRACT

A pillar structure that is configured to include an outer panel and an inner panel and in which an opening portion into which a retractor is inserted is formed in a lower portion of the inner panel, wherein a portion of the inner panel is depressed to the outside of a vehicle, whereby a retractor connection portion to which the retractor is connected, a front-side inclined portion disposed and inclined on the front side in a vehicle front-back direction of the retractor connection portion, and a rear-side inclined portion disposed and inclined on the rear side in the vehicle front-back direction of the retractor connection portion are formed, and an inclination of the rear-side inclined portion is formed gentler than an inclination of the front-side inclined portion.

1 Claim, 5 Drawing Sheets

PILLAR STRUCTURE

TECHNICAL FIELD

The present invention relates to a pillar structure which is configured to include an outer panel and an inner panel and in which an opening portion in which a retractor is inserted is formed in a lower portion of the inner panel.

BACKGROUND ART

Patent Literature 1 discloses a pillar structure in which an accommodation hole that accommodates a retractor is formed in a lower portion of an inner panel. In the pillar structure, an upper portion of the accommodation hole in the inner panel is depressed to the outside of a vehicle, thereby forming a connection portion to which an upper portion of the retractor is connected. Then, the front side in a vehicle front-back direction of the connection portion is formed into an inclined surface facing the front of the vehicle and the rear side in the vehicle front-back direction of the connection portion is formed into an inclined surface facing the rear of the vehicle.

CITATION LIST

Patent Literature

[Patent Literature 1] Japanese Unexamined Patent Application Publication No. 2003-226225

SUMMARY OF INVENTION

Technical Problem

However, in the pillar structure described in Patent Literature 1, the inclination of the inclined surface which is disposed on the front side in the vehicle front-back direction of the connection portion is formed gentler than the inclination of the inclined surface which is disposed on the rear side in the vehicle front-back direction of the connection portion. For this reason, if a vehicle has the pillar structure described in Patent Literature 1, since at the time of side impact, the deformation of the front side in the vehicle front-back direction of a pillar is promoted, the pillar falls down to a front seat side. Further, at the time of side impact on a rear door, large load is input to the rear side in the vehicle front-back direction of the pillar through an impact beam disposed in the rear door and a door hinge mounted in the pillar. For this reason, large tensile load acts on the rear side in the vehicle front-back direction of a lower portion of the pillar, which is connected to a rocker, and thus there is a possibility that the lower portion of the pillar may be broken with respect to the rocker.

Therefore, an object of the present invention is to provide a pillar structure in which it is possible to suppress falling-down of a pillar to the front seat side and also suppress breakage of the pillar at the time of side impact.

Solution to Problem

According to an aspect of the present invention, there is provided a pillar structure that is configured to include an outer panel and an inner panel and in which an opening portion in which a retractor is inserted is formed in a lower portion of the inner panel, in which a portion of the inner panel is depressed to the outside of a vehicle, whereby a retractor connection portion to which the retractor is connected, a front-side inclined portion disposed and inclined on the front side in a vehicle front-back direction of the retractor connection portion, and a rear-side inclined portion disposed and inclined on the rear side in the vehicle front-back direction of the retractor connection portion are formed, and an inclination of the rear-side inclined portion is formed gentler than an inclination of the front-side inclined portion.

In the pillar structure according to the above aspect of the present invention, if the retractor is pushed into the inside of a vehicle due to side impact, load is input from the retractor to the retractor connection portion. For this reason, the retractor connection portion becomes a side impact load input portion in the inner panel. However, stress which is generated in the inner panel due to the input of the load is dispersed by the inclinations of the front-side inclined portion and the rear-side inclined portion which are respectively disposed on the front side in the vehicle front-back direction and the rear side in the vehicle front-back direction of the retractor connection portion, and thus deformation of the front-side inclined portion and the rear-side inclined portion is promoted. In this way, it is possible to suppress the inner panel being broken from a retractor opening portion.

Then, the inclination of the rear-side inclined portion is formed gentler than the inclination of the front-side inclined portion, whereby the deformation of the rear-side inclined portion is promoted further than the deformation of the front-side inclined portion. For this reason, it is possible to make the pillar go around to the rear side in the vehicle front-back direction so as to avoid a front passenger. In this way, it is possible to improve the safety of the front passenger at the time of side impact.

In addition, at the time of side impact to a rear door, load is input to the rear side in the vehicle front-back direction of the pillar through an impact beam disposed in the rear door and a door hinge mounted in the pillar. For this reason, tensile load that acts on a lower portion of the pillar, which is connected to a rocker, becomes larger on the rear side in the vehicle front-back direction than the front side in the vehicle front-back direction. However, as described above, since the deformation of the rear-side inclined portion is promoted further than the deformation of the front-side inclined portion, it is possible to reduce the tensile load that acts on the rear side in the vehicle front-back direction of the lower portion of the pillar, which is connected to the rocker. In this way, it is possible to suppress the breakage of the lower portion of the pillar with respect to the rocker.

In the pillar structure according to the above aspect of the present invention, a width in the vehicle front-back direction of at least one of the front-side inclined portion and the rear-side inclined portion may gradually change as it becomes more distant from a connection position between the retractor and the retractor connection portion.

In this manner, the inclination widths of the front-side inclined portion and the rear-side inclination gradually change, whereby it is possible to gradually disperse stress acting on the inclined portions. In this way, since it is possible to suppress stress being concentrated locally, it is possible to appropriately suppress the breakage of the pillar.

Advantageous Effects of Invention

According to the present invention, it is possible to suppress falling-down of a pillar to the front seat side and also suppress breakage of the pillar at the time of side impact.

DESCRIPTION OF EMBODIMENTS

Figure 1:
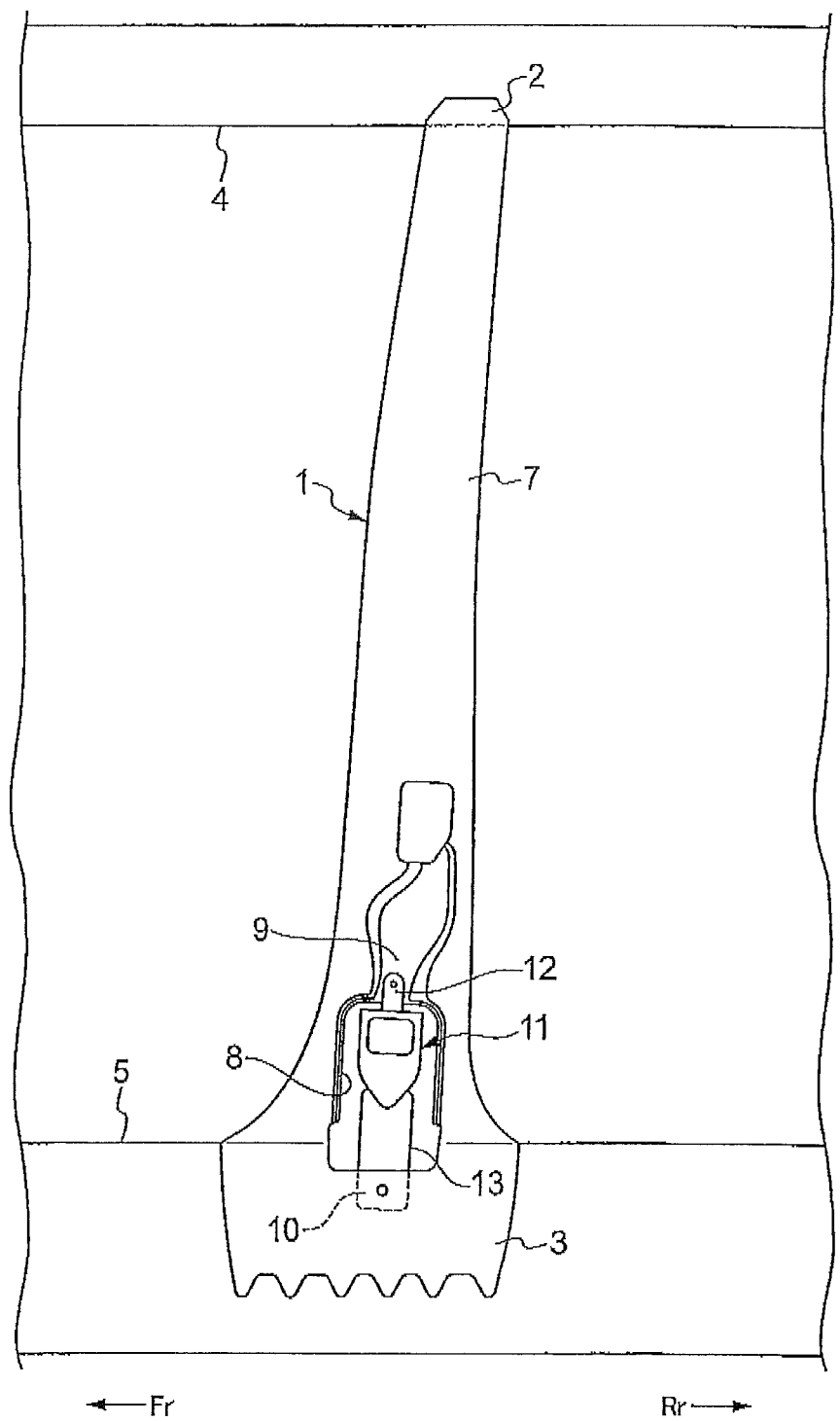
FIG. 1 is a front view when a center pillar according to an embodiment is viewed from the inside of a vehicle.

Hereinafter, an embodiment of a pillar structure according to the present invention will be described with reference to the drawings. This embodiment is an example in which the pillar structure according to the present invention is applied to a center pillar. In addition, in each drawing, the same or equivalent element is denoted by the same reference numeral and overlapping description is omitted.

FIG. 1 is a front view when a center pillar according to an embodiment is viewed from the inside of a vehicle. As shown in FIG. 1, a center pillar 1 according to this embodiment is disposed at a central portion in a front-back direction of the vehicle and extends in an up-and-down direction of the vehicle. An upper end portion 2 of the center pillar 1 is connected to a roof side rail 4 of the vehicle and a lower end portion 3 is connected to a rocker 5 of the vehicle. The connection of the upper end portion 2 and the roof side rail 4 and the connection of the lower end portion 3 and the rocker 5 can be performed by, for example, spot welding.

Figure 2:
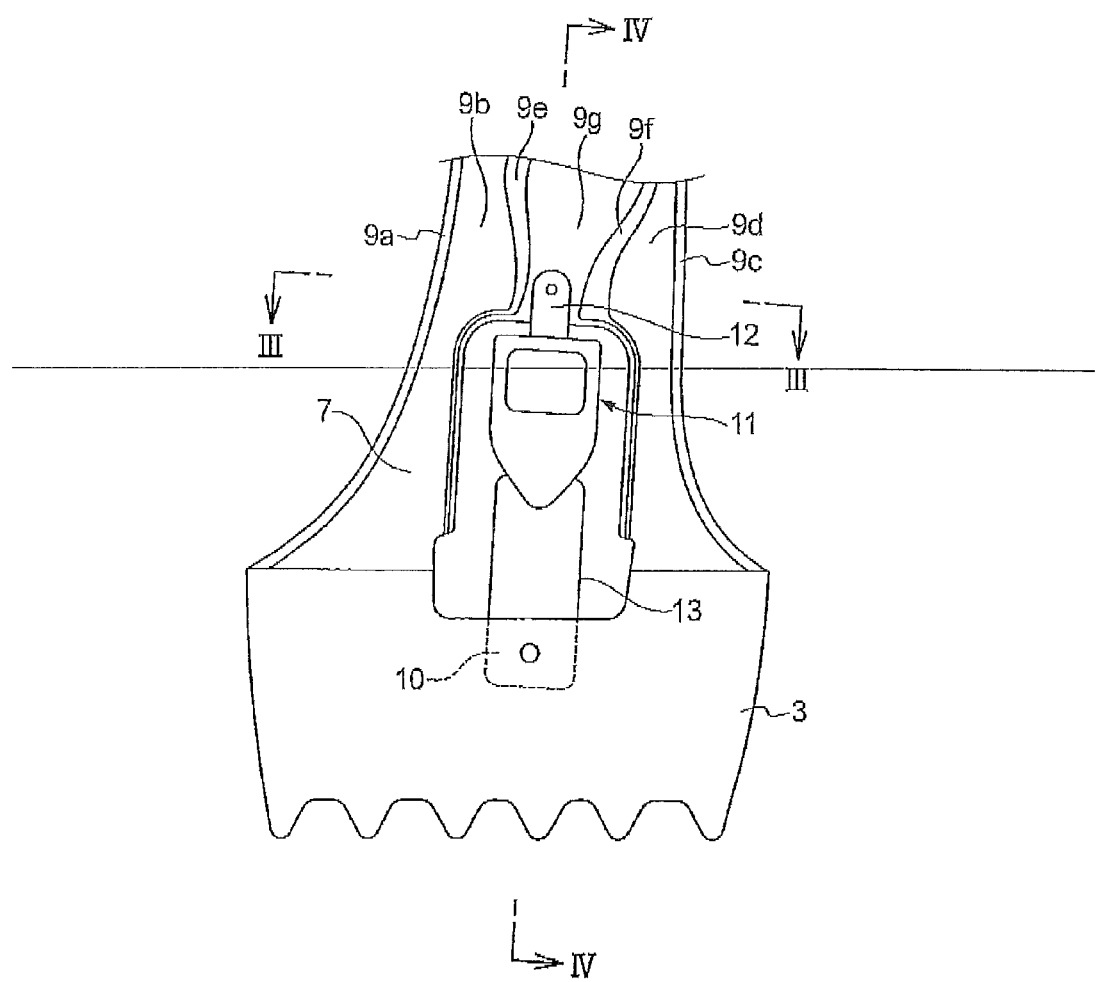
FIG. 2 is a partially enlarged view showing a lower portion of the center pillar.
Figure 3:
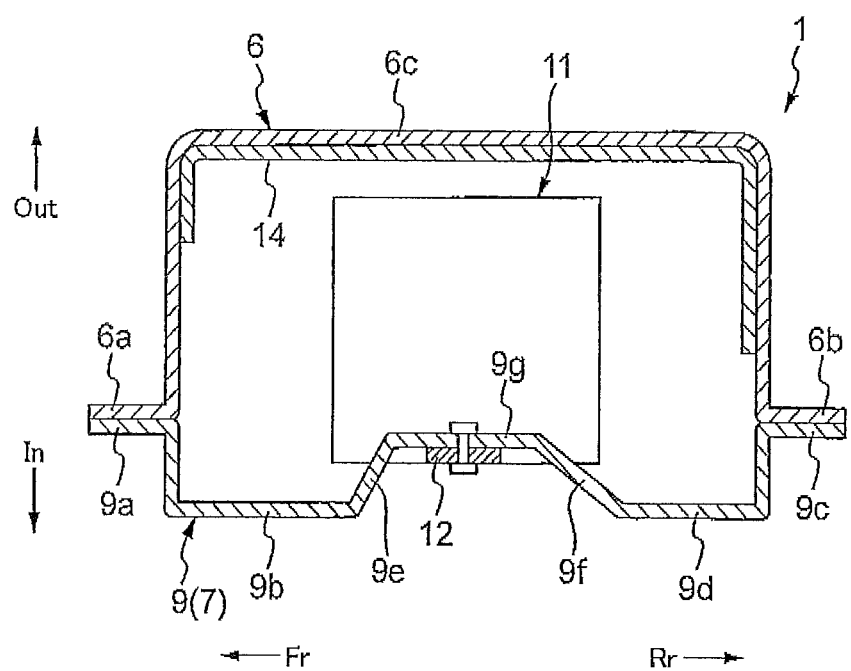
FIG. 3 is a partial cross-sectional view taken along line III-III shown in FIG. 2.
Figure 4:
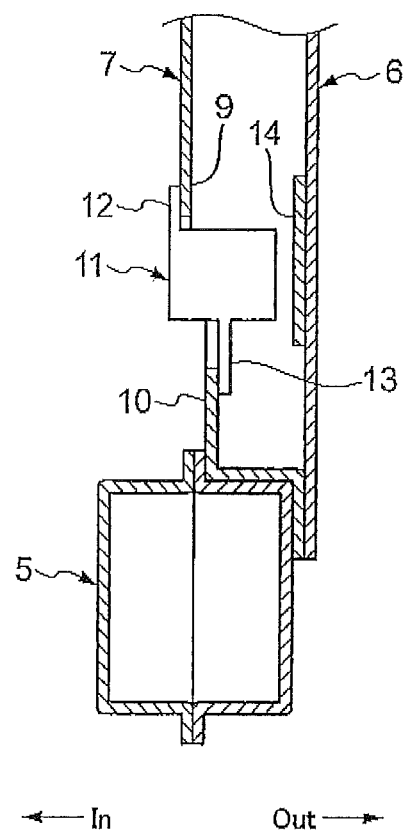
FIG. 4 is a partial cross-sectional view taken along line IV-IV shown in FIG. 2.

FIG. 2 is a partially enlarged view showing a lower portion of the center pillar. FIG. 3 is a partial cross-sectional view taken along line III-III shown in FIG. 2. FIG. 4 is a partial cross-sectional view taken along line IV-IV shown in FIG. 2. As shown in FIGS. 2 to 4, the center pillar 1 is configured by joining an outer panel 6 which is disposed on the vehicle outside and an inner panel 7 which is disposed on the vehicle inside (on the inside of a vehicle interior), so as to form a closed cross-section. Then, a retractor opening portion 8 in which a retractor 11 is inserted is formed in a lower portion of the inner panel 7.

The outer panel 6 is formed so as to have a substantially sideway U-shaped cross section bulging to the outside of the vehicle. The outer panel 6 is provided with a front-side connection flange portion 6a which is disposed on the front side in the vehicle front-back direction and connected to the inner panel 7, a rear-side connection flange portion 6b which is disposed on the rear side in the vehicle front-back direction and connected to the inner panel 7, and a bulging portion 6c which is connected to the front-side connection flange portion 6a and the rear-side connection flange portion 6b and bulges to the outside of the vehicle.

In the outer panel 6, a hinge (not shown) of a rear door (not shown) is mounted on the vehicle outside and on the rear side in the vehicle front-back direction. Further, in the outer panel 6, a hinge reinforcement 14 for improving the mounting rigidity of the hinge is mounted on the vehicle inside corresponding the hinge.

The retractor 11 is a device which winds a seat belt (not shown). An upper connection piece 12 which is connected to an inner panel opening upper portion 9 that is located above the retractor opening portion 8 in the inner panel 7 is provided at an upper end portion of the retractor 11. A lower connection piece 13 which is connected to an inner panel opening lower portion 10 that is located below the retractor opening portion 8 in the inner panel 7 is provided at a lower end portion of the retractor 11.

The inner panel opening upper portion 9 is provided with a front-side connection flange portion 9a which is disposed on the front side in the vehicle front-back direction and connected to the front-side connection flange portion 6a of the outer panel 6, a front-side bulging portion 9b which bulges from the front-side connection flange portion 9a to the inside of the vehicle and extends toward the rear side in the vehicle front-back direction, a rear-side connection flange portion 9c which is disposed on the rear side in the vehicle front-back direction and connected to the rear-side connection flange portion 6b of the outer panel 6, a rear-side bulging portion 9d which bulges from the rear-side connection flange portion 9c to the inside of the vehicle and extends toward the front side in the vehicle front-back direction, a front-side inclined portion 9e which is depressed to the outside of the vehicle while being inclined from a leading end edge on the rear side in the vehicle front-back direction of the front-side bulging portion 9b to the rear side in the vehicle front-back direction, a rear-side inclined portion 9f which is depressed to the outside of the vehicle while being inclined from a leading end edge on the front side in the vehicle front-back direction of the rear-side bulging portion 9d to the front side in the vehicle front-back direction, and a flat plate-shaped retractor connection portion 9g which is connected to a leading end edge on the vehicle outside of the front-side inclined portion 9e and a leading end edge on the vehicle outside of the rear-side inclined portion 9f and to which the upper connection piece 12 of the retractor 11 is connected. That is, in the inner panel opening upper portion 9, a portion between the front-side bulging portion 9b and the rear-side bulging portion 9d is depressed to the outside of the vehicle, whereby the retractor connection portion 9g, the front-side inclined portion 9e which is disposed and inclined on the front side in the vehicle front-back direction of the retractor connection portion 9g, and the rear-side inclined portion 9f which is disposed and inclined on the rear side in the vehicle front-back direction of the retractor connection portion 9g are formed.

Then, the upper connection piece 12 of the retractor 11 is connected to the vehicle inside of the retractor connection portion 9g and the lower connection piece 13 of the retractor 11 is connected to the vehicle outside of the inner panel opening lower portion 10, whereby the retractor 11 is retained in a state of protruding from the inner panel 7 to the outside of the vehicle. In addition, the connection of the retractor connection portion 9g and the upper connection piece 12 can be performed, for example, by connecting the retractor connection portion 9g and the upper connection piece 12 by a bolt. Further, the connection of the inner panel opening lower portion 10 and the lower connection piece 13 can be performed, for example, by connecting the inner panel opening lower portion 10 and the lower connection piece 13 by a bolt.

The inclination of the rear-side inclined portion 9f is formed gentler than the inclination of the front-side inclined portion 9e. That is, the inclination angle of the rear-side inclined portion 9f which is inclined to the outside of the vehicle with respect to a line parallel to the front-back direction of the vehicle is made smaller than the inclination angle of the front-side inclined portion 9e which is inclined to the outside of the vehicle with respect to the line parallel to the front-back direction of the vehicle.

The width (the inclination width) in the vehicle front-back direction of the front-side inclined portion 9e gradually widens as it becomes more distant from the connection position between the retractor 11 and the retractor connection portion 9g in the up-and-down direction of the vehicle. Further, the width (the inclination width) in the vehicle front-back direction of the rear-side inclined portion 9f gradually narrows as it becomes more distant from the connection position between the retractor 11 and the retractor connection portion 9g in the up-and-down direction of the vehicle. Specifically, the inclination width of the front-side inclined portion 9e gradually widens as it goes toward the upper side of the vehicle from the connection position between the retractor 11 and the retractor connection portion 9g. Further, the inclination width of the rear-side inclined portion 9f gradually narrows as it goes toward the upper side of the vehicle from the connection position between the retractor 11 and the retractor connection portion 9g.

Next, an operation and effects of the center pillar 1 according to this embodiment will be described.

Figure 5:
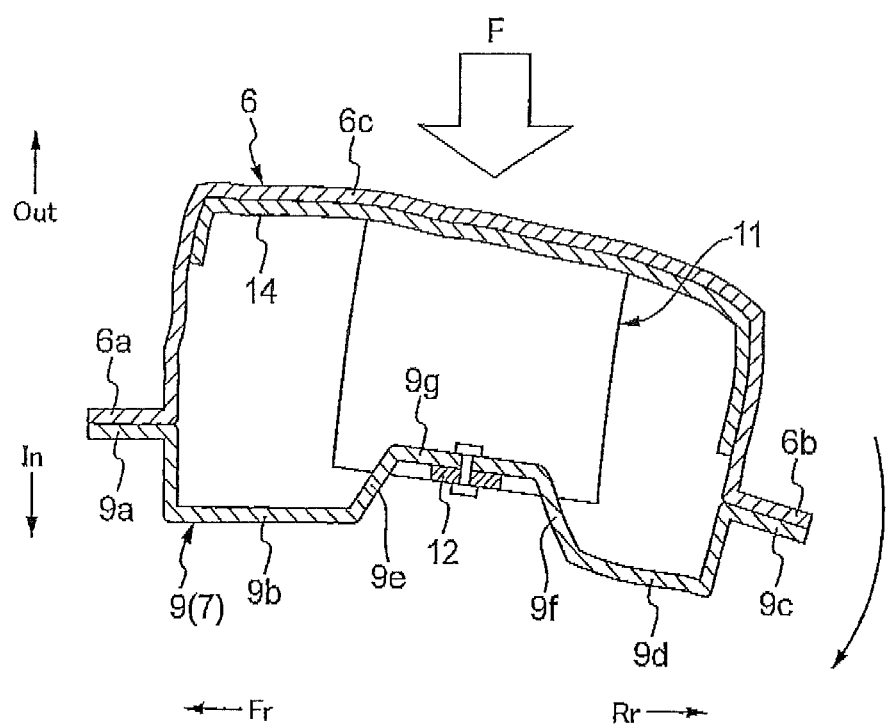
FIG. 5 is a view showing a deformation state of the center pillar at the time of side impact.

FIG. 5 is a diagram showing a deformation state of the center pillar at the time of side impact. As shown in FIG. 5, if another vehicle laterally collides with the center pillar 1 of one's own vehicle (side impact), load F toward the vehicle inside from the vehicle outside is input to the center pillar 1. Then, the outer panel 6 of the center pillar 1 is pushed into the vehicle inside, and thus the load F is transmitted from the outer panel 6 to the retractor 11 through the hinge reinforcement 14. In addition, the retractor 11 is pushed into the vehicle inside, and thus the load F is input from the upper connection piece 12 of the retractor 11 to the retractor connection portion 9g of the inner panel opening upper portion 9. For this reason, the retractor connection portion 9g becomes a side impact load input portion in the inner panel 7. In this way, stress due to the load F is generated in the inner panel opening upper portion 9.

Then, the stress which is generated in the inner panel opening upper portion 9 is dispersed by the inclination of the front-side inclined portion 9e disposed on the front side in the vehicle front-back direction of the retractor connection portion 9g and the inclination of the rear-side inclined portion 9f disposed on the rear side in the vehicle front-back direction of the retractor connection portion 9g, and thus deformation is promoted in the front-side inclined portion 9e and the rear-side inclined portion 9f. In this way, it is possible to suppress the inner panel 7 being broken from the retractor opening portion 8.

At this time, since the inclination of the rear-side inclined portion 9f is formed gentler than the inclination of the front-side inclined portion 9e, the deformation of the rear-side inclined portion 9f is promoted further than the deformation of the front-side inclined portion 9e. For this reason, the center pillar 1 goes around to the rear side in the vehicle front-back direction so as to avoid a front passenger seated on a front seat of the vehicle. In this way, it is possible to improve the safety of the front passenger at the time of side impact.

On the other hand, if another vehicle laterally collides with a rear door (not shown) of one's own vehicle, load F toward the vehicle inside from the vehicle outside is input to the rear side in the vehicle front-back direction of the center pillar 1 through an impact beam (not shown) disposed in the rear door and a door hinge (not shown) mounted in the center pillar 1. For this reason, tensile load that acts on the lower end portion 3 of the center pillar 1, which is connected to the rocker 5, becomes larger on the rear side in the vehicle front-back direction than the front side in the vehicle front-back direction. However, as described above, the deformation of the rear-side inclined portion 9f is promoted further than the deformation of the front-side inclined portion 9e, whereby it is possible to reduce the tensile load that acts on the rear side in the vehicle front-back direction of the lower end portion 3. In this way, it is possible to suppress the breakage of the lower end portion 3 with respect to the rocker 5.

Further, since the widths in the vehicle front-back direction of the front-side inclined portion 9e and the rear-side inclined portion 9f gradually change as it becomes more distant from the connection position between the retractor 11 and the retractor connection portion 9g in the up-and-down direction of the vehicle, it is possible to gradually disperse stress acting on the front-side inclined portion 9e and the rear-side inclined portion 9f, in the up-and-down direction of the vehicle. In this way, since it is possible to suppress stress being concentrated locally, it is possible to appropriately suppress the breakage of the center pillar 1. In particular, as in the rear-side inclined portion 9f, the width in the vehicle front-back direction gradually narrows as it becomes more distant from the connection position between the retractor 11 and the retractor connection portion 9g in the up-and-down direction of the vehicle, whereby it is possible to gradually increase the rigidity of the inner panel 7 toward the upper side of the vehicle. In this way, it is possible to maintain the strength of the inner panel 7 while promoting the deformation of the inner panel opening upper portion 9.

The preferred embodiment of the present invention has been described above. However, the present invention is not limited to the embodiment described above.

For example, in the embodiment described above, a configuration has been described in which only the inner panel opening upper portion 9 is partially depressed to the outside of the vehicle, thereby forming a front-side inclined portion and a rear-side inclined portion. However, the inner panel opening lower portion 10 may also be partially depressed to the outside of the vehicle, thereby forming a retractor connection portion, a front-side inclined portion, and a rear-side inclined portion, similar to the inner panel opening upper portion 9.

Further, in the embodiment described above, a configuration has been described in which the width in the vehicle front-back direction of the front-side inclined portion 9e gradually changes in a direction to widen toward the upper side of the vehicle and the width in the vehicle front-back direction of the rear-side inclined portion 9f gradually changes in a direction to narrow toward the upper side of the vehicle. However, if these widths gradually change as it becomes more distant from the connection position between the retractor 11 and the retractor connection portion 9g, these widths may gradually change in a direction to widen and may gradually change in a direction to narrow. In addition, the widths in the vehicle front-back direction of the front-side inclined portion 9e and the rear-side inclined portion 9f need not be gradually changed necessarily. Further, only the width in the vehicle front-back direction of any one of the front-side inclined portion 9e and the rear-side inclined portion 9f may be gradually changed.

Further, in the embodiment described above, the pillar structure according to the present invention has been described as being applied to the center pillar 1. However, if a pillar is a pillar suitable for making the pillar go around to the rear side in the vehicle front-back direction, such as a C-pillar which is disposed on the rear side of a vehicle, the pillar structure according to the present invention may be applied to any pillar.

INDUSTRIAL APPLICABILITY

The present invention can be used as a structure of a center pillar of a vehicle.

REFERENCE SIGNS LIST

1: center pillar
2: upper end portion of center pillar

3: lower end portion of center pillar
4: roof side rail
5: rocker
6: outer panel
6a: front-side connection flange portion
6b: rear-side connection flange portion
6c: bulging portion
7: inner panel
8: retractor opening portion
9: inner panel opening upper portion
9a: front-side connection flange portion
9b: front-side bulging portion
9c: rear-side connection flange portion
9d: rear-side bulging portion
9e: front-side inclined portion
9f: rear-side inclined portion
9g: retractor connection portion
10: inner panel opening lower portion
11: retractor
12: upper connection piece of retractor
13: lower connection piece of retractor
14: hinge reinforcement

The invention claimed is:

1. A pillar structure for a vehicle, the pillar structure comprising:
an outer panel; and
an inner panel joined to the outer panel, the inner panel having a lower portion that includes an opening portion into which a retractor is inserted, wherein
an upper portion of the opening portion of the inner panel is depressed to an outside of the vehicle, the depressed upper portion forming (i) a retractor connection portion to which the retractor is connected, (ii) a front-side inclined portion disposed and inclined on a front side in a vehicle front-back direction of the retractor connection portion, and (iii) a rear-side inclined portion disposed and inclined on a rear side in the vehicle front-back direction of the retractor connection portion,
an inclination of the rear-side inclined portion is less than an inclination of the front-side inclined portion,
the front-side inclined portion has a width in the vehicle front-back direction that gradually widens in a direction away from a connection position between the retractor and the retractor connection portion, and
the rear-side inclined portion has a width in the vehicle front-back direction that gradually narrows in the direction away from the connection position between the retractor and the retractor connection portion.

* * * * *